(No Model.)

C. J. LIPPOLD.
WEIGHING SCALE.

No. 567,107. Patented Sept. 1, 1896.

Witnesses
J. M. Fowler Jr.
T. L. Clear

Inventor
Charles J. Lippold
By Chas. J. Stockman
Attorney

UNITED STATES PATENT OFFICE.

CHARLES J. LIPPOLD, OF WASHINGTON, DISTRICT OF COLUMBIA.

WEIGHING-SCALE.

SPECIFICATION forming part of Letters Patent No. 567,107, dated September 1, 1896.

Application filed July 13, 1896. Serial No. 598,987. (No model.)

*To all whom it may concern:*

Be it known that I, CHARLES J. LIPPOLD, a citizen of the United States, residing at Washington, in the District of Columbia, have invented certain new and useful Improvements in Weighing-Scales; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to weighing-scales, but relates more particularly to a support therefor constructed to permit the scale to be turned.

The object of the present invention is to provide a most simple and at the same time efficient means for clamping the scale removably to a pivotally-mounted plate; and to this end the invention consists in certain peculiarities in the construction, arrangement, and combinations of the several parts, substantially as hereinafter described, and particularly pointed out in the subjoined claims.

Figure 1:
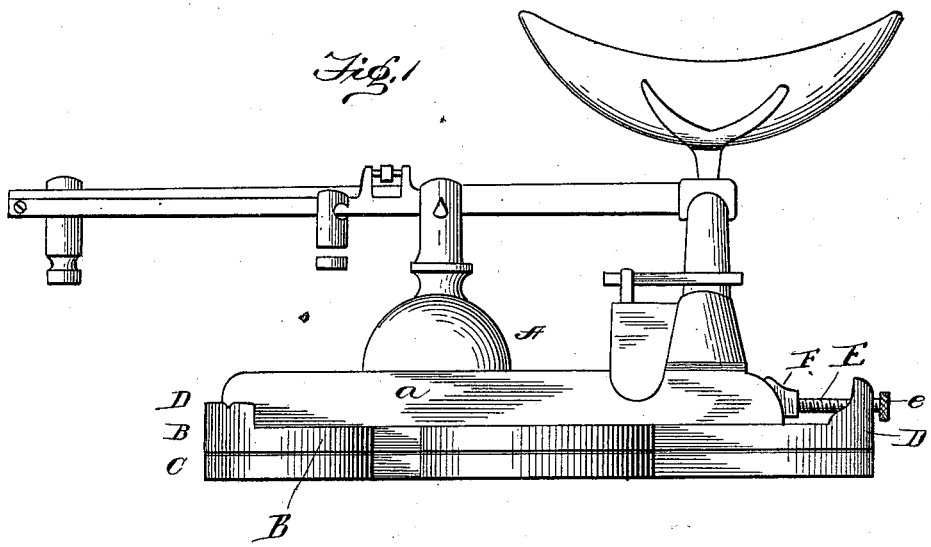
Figure 2:
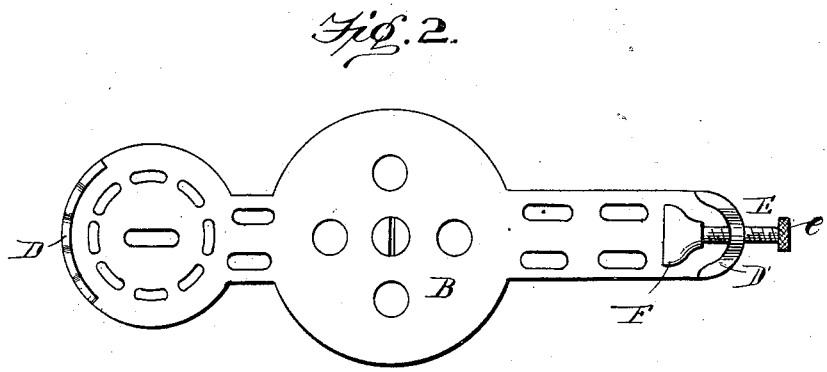
Figure 3:
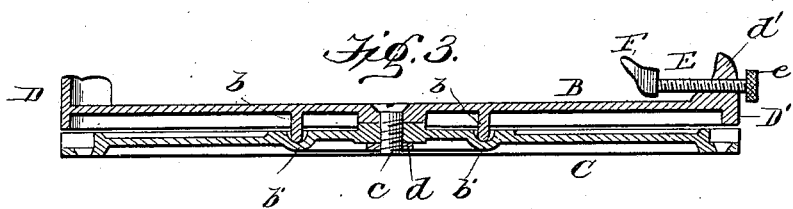
Figure 4:
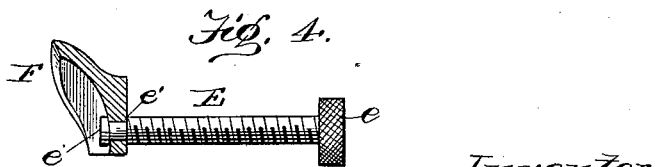

In the accompanying drawings, illustrating the invention, Figure 1 is a side elevation of a scale provided with my improvement. Fig. 2 is a plan view, and Fig. 3 a longitudinal section, of the scale-support; and Fig. 4 is a view of the movable member of the clamp, with the cap-piece thereof shown in section to disclose the manner in which it is mounted and held on the rotatable rod.

The same letters of reference designate the same parts in the several figures.

A designates the scale proper, which may be of any suitable construction, and B designates the plate, which is clamped to the scale-base by the means hereinafter described and which is pivotally mounted, so that it, together with the scale, may be rotated in order to bring the respective sides of the scale to any desired place suited to the user. This plate B may be of any desired shape or size suitable to the scale to which it is applied, and it is preferably mounted on a base-plate C in such manner that it may rotate thereon. The means by which the upper plate is mounted so as to rotate without wabbling is identical with that shown in my pending application, Serial No. 489,857, and consists of a ring $b$, projecting downward from the upper plate into a groove $b'$ in the base-plate, and a pivotal post $c$ and nut $d$, which secure the two plates together, said post extending through registered perforations formed in the parts of said plates bounded by said ring and groove, respectively.

The upper plate B has lugs D D' at its opposite ends, one of which, as D, is intended to engage an end of the scale-base and thereby serve as one member of the clamp, and the other of which serves as a support for the movable member of the clamp. Said movable clamp member consists of a rod E, adjustable toward and from the scale-base, and a cap-piece F, mounted directly upon the inner end of said rod. This rod is made only of such length as will enable it to project cap F into engagement with that end of the scale-base which is nearer the lug that supports said rod, whereby the construction is materially simplified and cheapened.

The adjusting-rod E is preferably threaded and engages threaded walls of an opening $d'$ in the lug D', through which it extends. Thus it will be seen that by rotating the rod in one direction or the other the cap F will be advanced or retracted into or out of engagement with the base of the scale, and will be held by said threads against accidental displacement from the place to which it is adjusted. Said rod is provided at its outer end with a suitable head $e$ for convenience in operating it.

Inasmuch as the cap F is adjusted by rotation of its supporting-rod and as the inner surface of said cap is concaved to efficiently engage the scale-base it, obviously, would be difficult, if not impossible, to adjust the cap by the rod into sufficiently close engagement with the scale-base to enable it effectually to clamp to the support if said cap were so mounted upon the rod as that it would rotate therewith. Therefore the cap is loosely swiveled upon the smooth inner extremity of said rod, as shown in Fig. 4, and is held thereon by the shoulders $e'$ $e'$ adjacent thereto, whereby the cap will be rotated on the rod, but rotation of the rod will not impart similar movement to the cap.

From the above it will readily be seen that

I have provided a clamping means which is extremely simple and cheap in construction and at the same time highly effective in operation.

Although I have described the scale-base as engaged at one side or end by a stationary lug D, it is obvious that it may be engaged at said side, as well as at the one opposite thereto, by a movable clamp member without departing from the spirit of the invention.

Having now described the invention, what I claim is—

1. The combination with the stationary base-plate, and with the scale, of the plate removably clamped to the base of said scale and pivotally mounted upon said base-plate, said pivoted plate having lugs at its opposite ends, the rotatable clamping-rod engaged with one of said lugs, and the concaved cap, swiveled upon the end of said rod and designed to engage the scale-base, substantially as described.

2. In a scale-support, the combination with the stationary base-plate, of the revoluble plate mounted thereon and having upwardly-projecting flanges at its ends, a revoluble clamping-rod supported by one of said flanges, and a cap, freely rotative on the inner end of said rod and formed with a concave inner face to engage the adjacent end of the scale-base.

3. The combination with the scale having a convex base, and with the stationary base-plate; of a rotative plate, pivotally mounted on said base-plate and provided with upwardly-extending flanges at its ends; a threaded horizontal rod, engaging one of said flanges and having its inner extremity formed with a smooth-surfaced groove and with shoulders at opposite ends of said groove: and a cap freely rotatable upon said rod, said cap being mounted upon the smooth part of said rod and held by the shoulders adjacent thereto and having a concave inner face to receive the adjacent part of the convex base of the scale.

In testimony whereof I affix my signature in presence of two witnesses.

CHARLES J. LIPPOLD.

Witnesses:
 CHARLES J. STOCKMAN,
 GEORGE W. SHOOK.